(12) United States Patent
Xu

(10) Patent No.: US 7,944,191 B2
(45) Date of Patent: May 17, 2011

(54) SWITCHING REGULATOR WITH AUTOMATIC MULTI MODE CONVERSION

(75) Inventor: Peng Xu, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 11/250,215

(22) Filed: Oct. 14, 2005

(65) Prior Publication Data

US 2007/0085519 A1    Apr. 19, 2007

(51) Int. Cl.
*G05F 1/618* (2006.01)
(52) U.S. Cl. .......................... 323/259; 323/225
(58) Field of Classification Search .................. 323/259, 323/262–263, 288, 285, 223, 224, 252, 225
See application file for complete search history.

(56) References Cited

U.S. PATENT DOCUMENTS

| 5,130,561 A | * | 7/1992 | Elliott et al. | 307/31 |
| 6,166,527 A | * | 12/2000 | Dwelley et al. | 323/222 |
| 6,215,286 B1 | * | 4/2001 | Scoones et al. | 323/222 |
| 6,366,070 B1 | * | 4/2002 | Cooke et al. | 323/284 |
| 6,580,253 B2 | * | 6/2003 | Kanakubo et al. | 323/222 |
| 6,984,967 B2 | * | 1/2006 | Notman | 323/282 |
| 7,176,667 B2 | * | 2/2007 | Chen et al. | 323/282 |
| 7,265,524 B2 | * | 9/2007 | Jordan et al. | 323/225 |

* cited by examiner

*Primary Examiner* — Harry Behm
(74) *Attorney, Agent, or Firm* — Perkins Coie LLP

(57) ABSTRACT

Methods and apparatus are disclosed for efficient switching regulators that adapt automatically to, and operate with, input voltages that are above, below, or equal to the output voltage. The disclosed switching regulators demonstrate advantages of both buck and boost converters at high efficiency.

4 Claims, 5 Drawing Sheets

SWITCHING REGULATOR WITH AUTOMATIC MULTI MODE CONVERSION

TECHNICAL FIELD

The embodiments described below relate, in general, to switch mode power supplies and, in particular, to efficient and automatic switching regulators operating from input voltages that are above, below, or equal to the output voltage.

BACKGROUND

Switch mode power supply (SMPS) is popular in powering ASICs, DRAMs, and other electronic devices because of its high efficiency. The selection of the SMPS topology requires consideration of the relationship of the input and output voltages. In some applications, the input voltage may be above, below, or equal to the output voltage.

One example is the portable devices such as digital cameras that use a single-cell Li-Ion battery to power a 3.3V rail, where the battery voltage is about 4.2V after charging up and drops to about 2.7V before the camera ceases to function. Appropriate efficiency is also required during the entire range of operation to maximize the battery usage life despite its limited size and weight. Such applications require SMPS's that can operate efficiently and automatically with input voltages that are above, below, or equal to the output voltage.

A buck converter can only be used if an input voltage remains higher than the output voltage. On the other hand, a boost converter may only be used if the input voltage stays less than the output voltage at all times. The well-known buck-boost converter can operate automatically from input voltages above, below, or equal to the output voltage, but cannot maintain a high efficiency over a wide range of input voltages. The buck-boost converter has a reasonable efficiency only when the input voltage is close to the output voltage, but it has much less efficiency than a buck converter when the input voltage is above the output voltage and much less than a boost converter when input voltage is below the output voltage.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The description of the embodiments of the invention and their applications as set forth herein is illustrative and is not intended to limit the scope of the invention. Variations and modifications of the embodiments are possible and practical alternatives to, or equivalents of the various elements of, the embodiments disclosed herein and are known to those of ordinary skill in the art. Such variations and modifications of the disclosed embodiments may be made without departing from the scope and spirit of the invention.

Figure 1A:
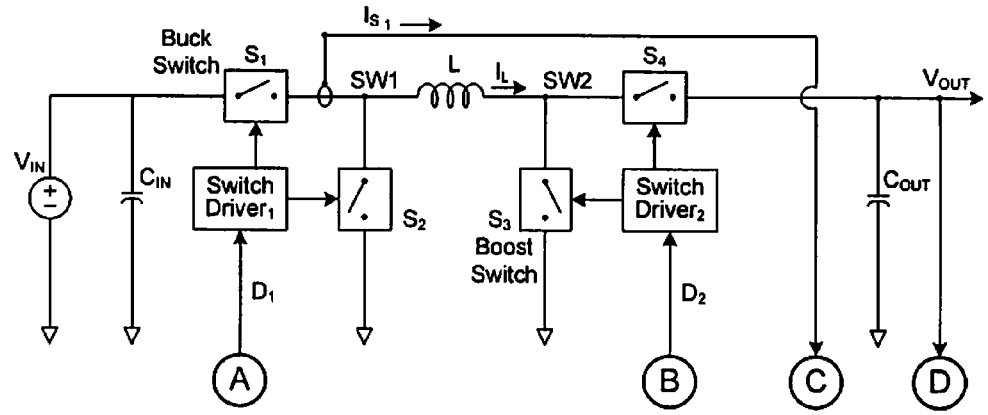
FIG. 1 shows a schematic diagram of different parts of an automatic multimode converter, in accordance with an embodiment of the invention.

The following detailed description discloses methods and apparatus for efficient and automatic multimode SMPS's with input voltages that are above, below, or equal to the output voltages. FIG. 1 shows a schematic diagram of different parts of an automatic multimode converter. The power stage shown in FIG. 1A includes four switches that are all actively controlled. $S_1$ is referred to as the buck switch, and $S_3$ is referred to as the boost switch. The power stage converts an input voltage to a desired output voltage.

Figure 1B:
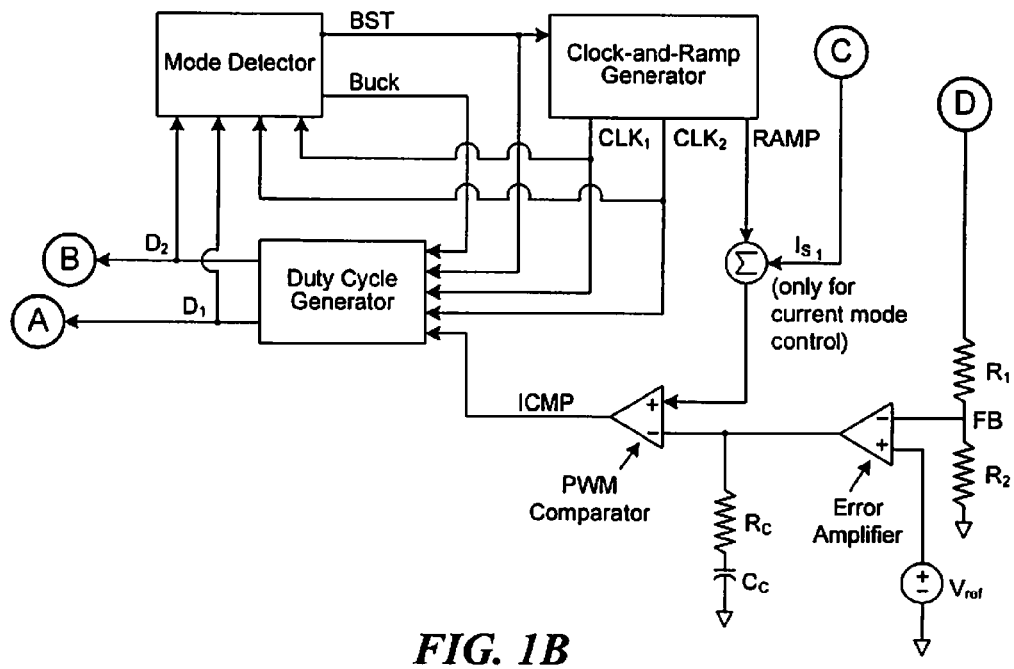
Figure 1C:
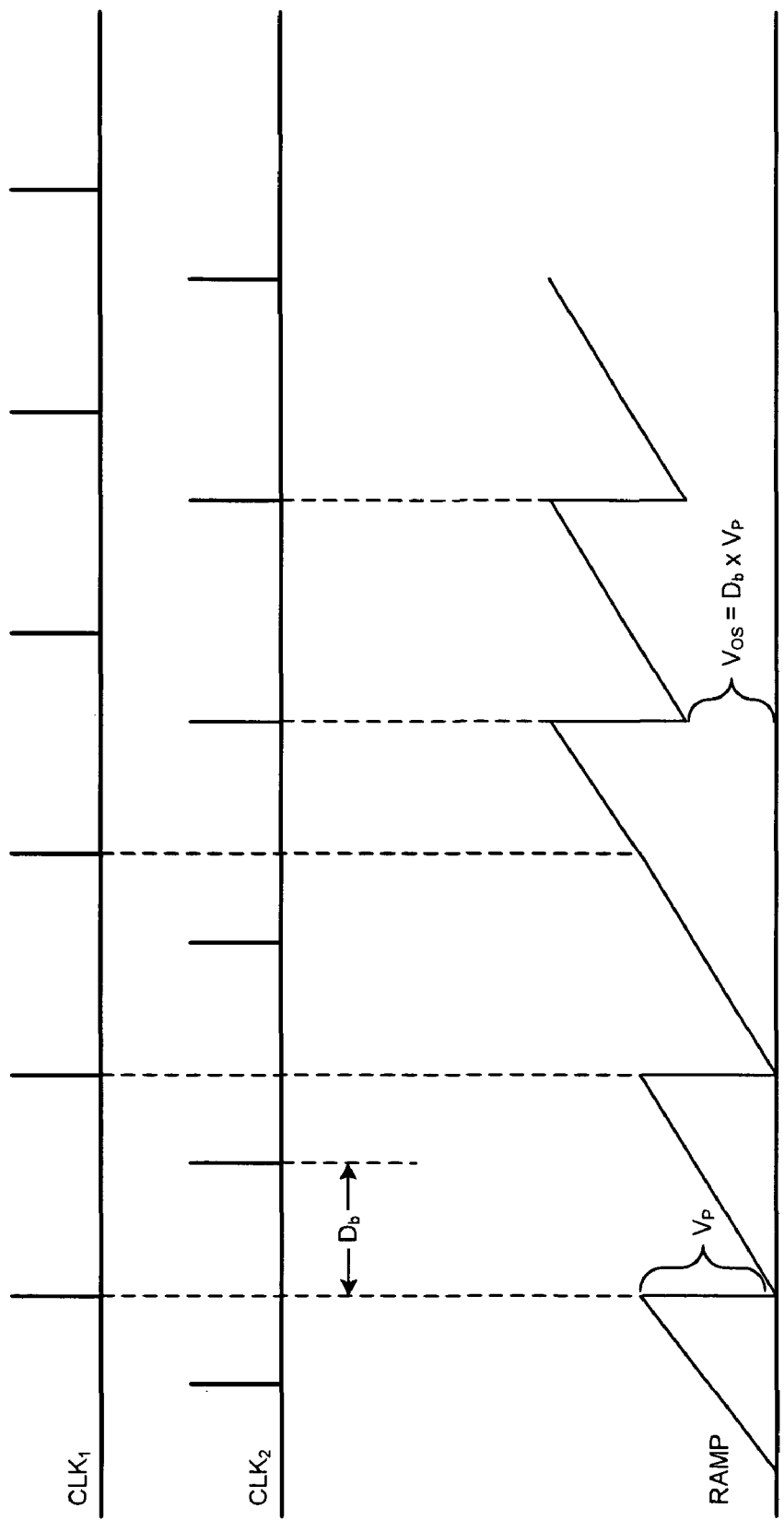

The control circuit shown in FIG. 1B, sends two control signals $D_1$ and $D_2$ to switch drivers of $S_1$ to $S_4$. When $D_1$="H" (High), $S_1$ is on and $S_2$ is off; and when $D_1$="L" (Low), $S_1$ is off and $S_2$ is on. When $D_2$="H", $S_3$ is on and $S_4$ is off; and when $D_2$="L", $S_3$ is off and $S_4$ is on. During any set of switch settings, the control circuit senses the output voltage $V_{out}$ of the power stage through resistor dividers $R_1$ and $R_2$, in comparison with a reference voltage $V_{ref}$. Variations of $V_{out}$ are sensed and amplified through the error amplifier (E/A). The output of the error amplifier E/A feeds the PWM comparator, and the output of the PWM comparator triggers the "L" state of $D_1$ or $D_2$ or both, according to the operation mode. Controlling power stage switches keep the output voltage $V_{out}$ substantially in a predetermined relation with the reference voltage $V_{ref}$.

The well-known current mode can also be employed in the embodiments of the present invention. In current mode control, the switch current or inductor current or other currents are measured and summed with the ramp signal. By feeding back the current info into the control loop, the line transient response and other dynamic characteristics are greatly improved.

The control circuit, as depicted in the embodiment of FIG. 1B, has three major blocks: (1) clock and ramp generator, (2) duty-cycle generator, and (3) mode detector. The clock and ramp generator generates two out-of-phase clock signals $CLK_1$ and $CLK_2$ and one RAMP signal. The phase delay of $CLK_1$ and $CLK_2$ is referred to as $D_b$. The RAMP signal of this embodiment has a saw-tooth shape and is synchronized with $CLK_1$ or $CLK_2$.

The converter shown in FIG. 1 has three operation modes: (1) "BUCK" mode, (2) "BUCK-BOOST" mode, and (3) "BOOST" mode. The mode detector circuit checks $D_1$ at $CLK_2$ moment. If $D_1$="L", the circuit is in the "BUCK" mode; otherwise, it is in the "BUCK-BOOST" or the "BOOST" mode. The mode detector circuit also checks $D_2$ at $CLK_1$ moment. If $D_2$="H", the circuit is in the "BOOST" mode; otherwise, it is in "BUCK" or "BUCK-BOOST" mode.

After determining the operation mode of the converter, the mode detector circuit feeds mode signals BUCK and BST to duty-cycle generator circuit, and the BST signal to the clock and ramp generator circuit, wherein "BUCK" mode is when BUCK signal is "H" and BST signal is "L"; "BUCK- BOOST" mode is when BUCK signal is like inverting CLK2 and BST signal is "L" and "BOOST" mode is when BUCK signal is like inverting CLK2 and BST signal is "H". According to the BST signal, the RAMP signal will smoothly extend when the circuit is entering into the "BOOST" mode, by adding a DC offset $V_{os}$ to the RAMP signal.

The DC offset $V_{os}$ is related to the phase delay of $CLK_1$ and $CLK_2$, and in this embodiment it is equal to $D_b*V_p$, where $V_p$ is the magnitude of the RAMP signal. The RAMP signal has a higher DC level in the "BOOST" mode than in the "BUCK" and the "BUCK-BOOST" mode. Among other signals discussed below, the RAMP signal is also fed to the PWM comparator. The duty-cycle generator circuit receives, as inputs, the mode signals BUCK and BST, clock signals $CLK_1$ and $CLK_2$, and the PWM comparator output ICMP.

The duty-cycle generator circuit identifies the operation mode according to the mode signals BUCK and BST. If the circuit is in the "BUCK" mode, $CLK_1$ triggers $D_1$ to "H", and ICMP triggers $D_1$ to "L"; while $D_2$ stays "L". If the circuit is in the "BOOST" mode, $CLK_2$ triggers $D_2$ to "H", and ICMP triggers $D_2$ to "L"; while D1 stays "H". If the circuit is in the "BUCK-BOOST" mode, $CLK_1$ triggers $D_1$ to "H", $CLK_2$ triggers $D_2$ to "H", and ICMP triggers both $D_1$ and $D_2$ to "L".

Figure 2:
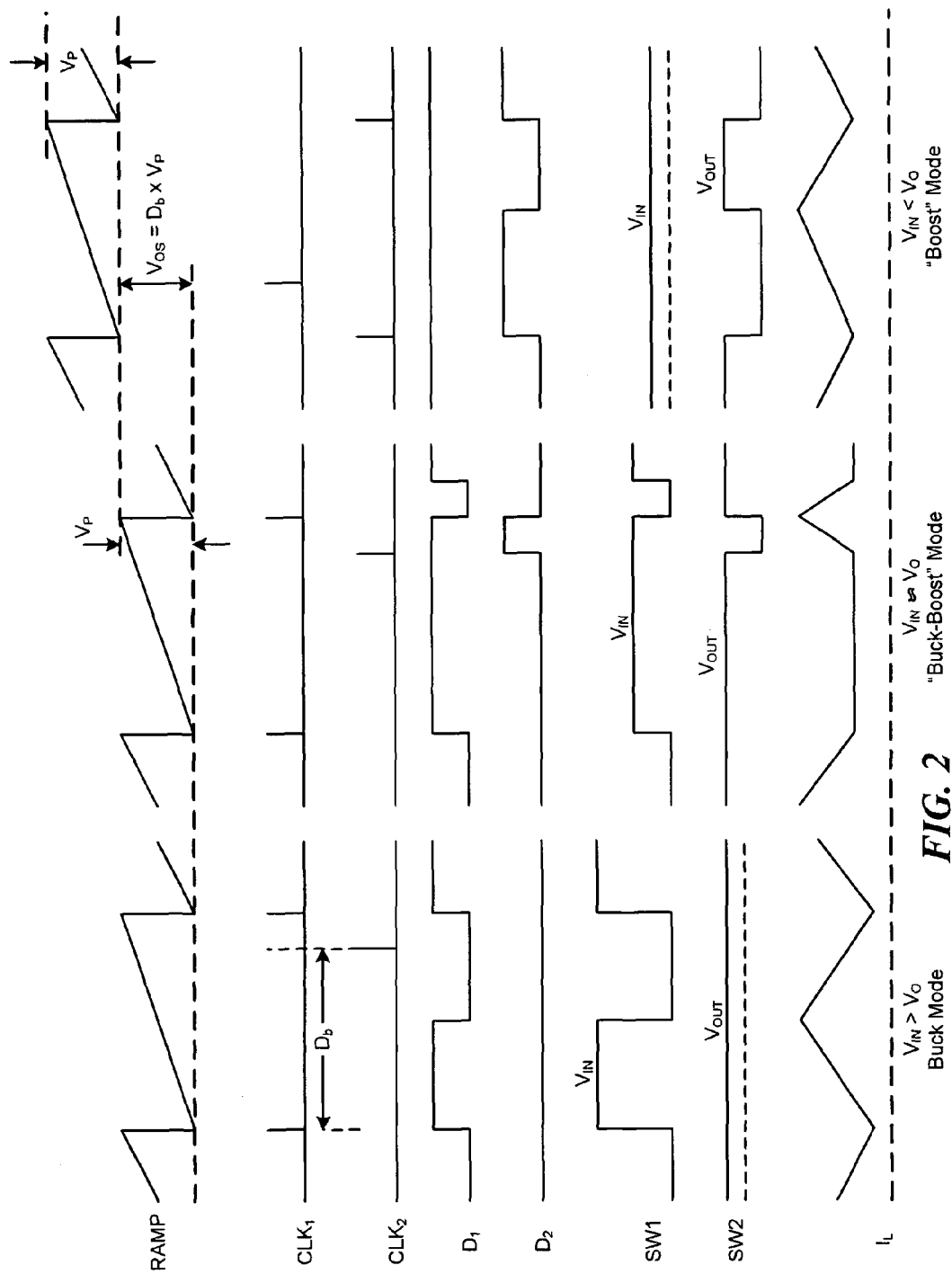
FIG. 2 shows operation waveforms of the automatic multimode converter shown in FIG. 1.

FIG. 2 shows some of the operation waveforms of the automatic multimode converter shown in FIG. 1. When $V_{in}$ is larger than $V_{out}$, the circuit is in the "BUCK" mode. When $V_{in}$ is close to the $V_{out}$, the circuit is in the "BUCK-BOOST" mode. And when $V_{in}$ is less than $V_{out}$, the circuit is in the "BOOST" mode. The transitions of different modes are automatic and smooth.

Figure 3:
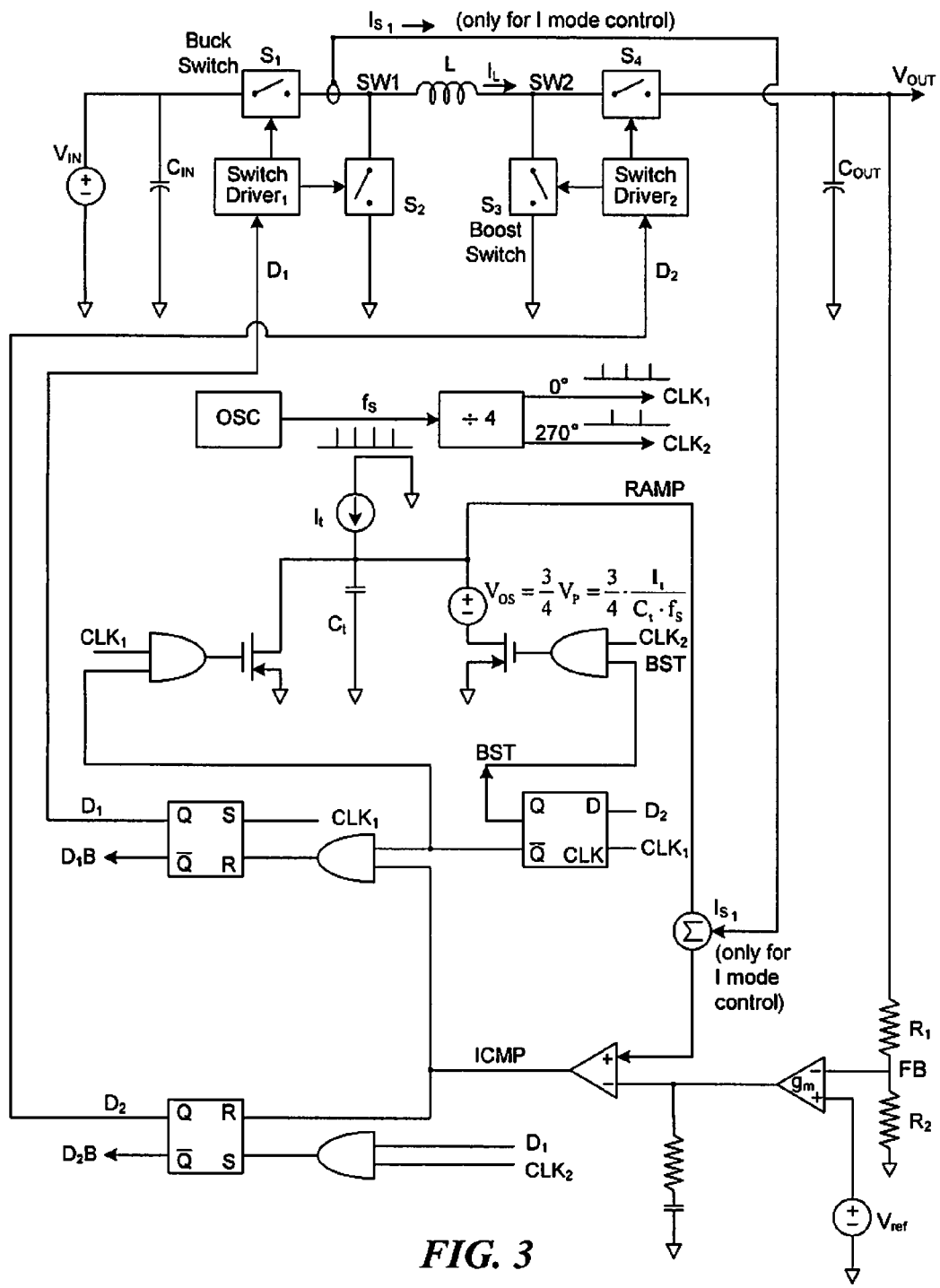
FIG. 3 shows an example of implementation details of the automatic multimode converter shown in FIG. 1.

FIG. 3 shows an example of implementation details of the automatic multimode converter shown in FIG. 1. FIG. 3 illustrates the details of embodiments of the duty-cycle generator, the clock and ramp generator, and the mode detector circuits.

Figure 4A:
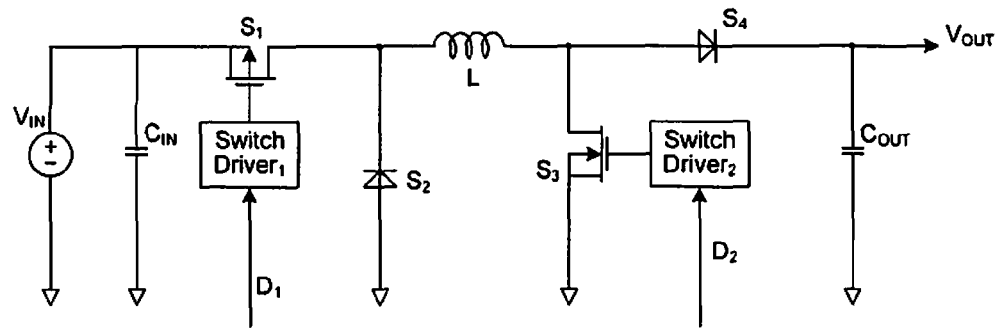
FIG. 4 shows another example of implementation details of the automatic multimode converter shown in FIG. 1.
Figure 4B:
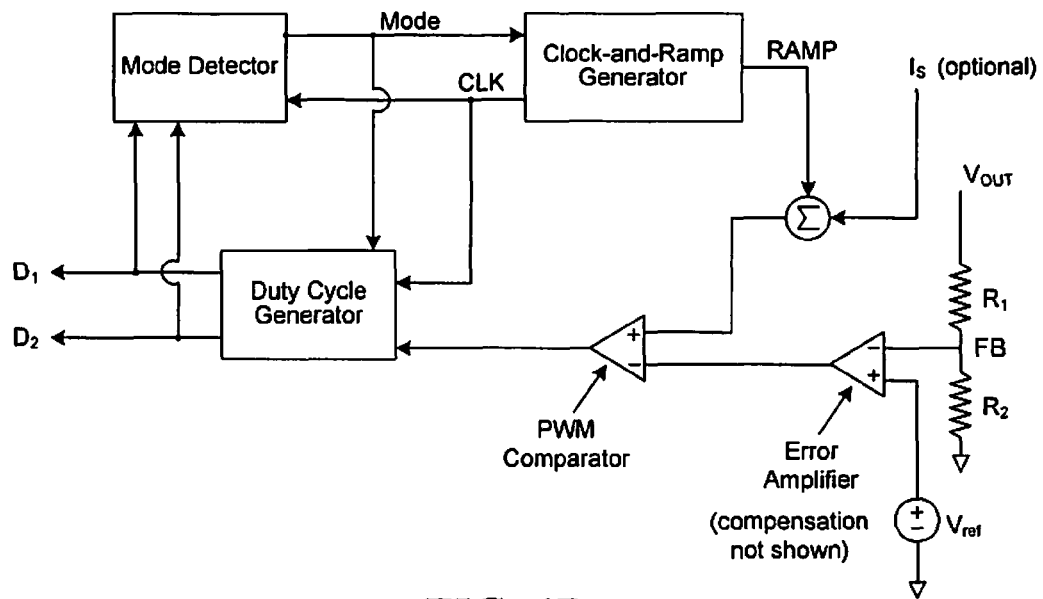

FIG. 4 shows another example of implementation details of the automatic multimode converter shown in FIG. 1. This implementation example comprises the following two components:

First component, a power stage shown in FIG. 4A, including: one inductor, one input capacitor, one output capacitor, and four switches ($S_1$ through $S_4$), wherein $S_1$ and $S_2$ are actively controlled and wherein $S_1$ is referred to as the buck switch and $S_2$ as the boost switch. The other two switches can be either passively or actively controlled; and, Second component, a control device shown in FIG. 4B, receiving feedback from the power stage and generating the control signals to drive at least two of the switches to modulate the output voltage and minimize power losses. The duty-cycle of the control signal for the buck switch is referred to as $D_1$, and the duty-cycle of the control signal for the boost switch is refereed as $D_2$. The control device checks $D_1$ and $D_2$ at CLK moments to determine the operation mode of the circuit so that the circuit can automatically operate between step-up and step-down conversions. The RAMP signal is automatically changed in different operation modes. In this embodiment the generation of $D_1$ and $D_2$ is also controlled by operation modes.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the invention provided herein can be applied to other systems, not necessarily the system described above. The elements and acts of the various embodiments described above can be combined to provide further embodiments.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A switch mode power supply (SMPS) capable of operating in three different operational modes including a buck mode, a boost mode, and a buck-boost mode, comprising:

a power stage further including a plurality of switches operatively switched to generate an output signal that has a predetermined relationship with an input signal, depending on which operational mode has been selected; and a controller stage for determining said operational modes, each of said operational modes being set by determining logic values of a first control signal at a first clock signal of fixed frequency and a second control signal at a second clock signal of fixed frequency respectively, said controller stage operable to change said logic values of said first control signal and said second control signal by comparing feedback signal (FB) to a reference signal ($V_{ref}$), wherein said controller stage further comprises:
(a) a clock-and-ramp generator for generating said first clock signal, said second clock signal, and a ramp signal, wherein said clock-and-ramp generator further comprises:
   (i) an oscillator circuit operable to generate a fixed frequency clock signal; and
   (ii) a frequency divider, electrically coupled to said oscillator circuit, operable to receive said fixed frequency clock signal and to generate said first clock signal and said second clock signal;
(b) a duty-cycle-generator for generating said first control signal and said second control signal; and
(c) a mode detector for selecting one of said operation mode wherein said clock-and-ramp generator further comprises:
a current source operable to generate a fixed current;
a first NAND gate electrically coupled to receive said first clock signal to drive a first n-channel Metal Oxide Semiconductor transistor;
a second NAND gate electrically coupled to receive said second clock signal to drive a second n-channel Metal Oxide Semiconductor transistor;
an offset voltage source, electrically coupled to said second nMOS transistor operable to generate a DC offset voltage proportional to said fixed frequency and said phase difference between said first clock signal and said second clock signal; and
a capacitor electrically coupled to said current source, said first nMOS transistor and said second nMOS transistor.

2. The switch-mode power supply of claim 1 wherein said duty cycle generator further comprises:
a first SR flip flop circuit having a first input terminal that receives said first clock signal; and
a third NAND gate having a first input terminal electrically coupled to the second input terminal of said first NAND gate, and an output terminal driving a second input terminal of said first SR flip flop circuit, the output terminal of said first SR flip flop circuit forming said first control signal.

3. The switch-mode power supply of claim 2 wherein said mode detector circuit further comprises:

a first mode indicator signal (BUCK) generator circuit further comprising a fourth NAND gate and a second SR flip flop circuit, said fourth NAND gate electrically coupled to receive said first control signal and said second clock signal, said second SR flip flop circuit having a first input terminal electrically coupled to the output terminal of said fourth NAND gate and a second input terminal electrically coupled to the second input terminal of said third NAND gate and to said current comparison signal (ICMP), the output terminal of said second SR flip flop circuit forming said second control signal; and
a second mode indicator signal (BOOST) generator circuit further comprising a synchronized D flip flop circuit having an input terminal electrically coupled to said second control signal (D2) and a second input terminal electrically coupled to said first clock signal; the output terminal of said synchronized D flip flop circuit electrically coupled to the second input terminal of said second NAND gate, and the inverse output terminal of said synchronized D flip flop circuit electrically coupled to the first input terminal of said third NAND gate.

4. A method of controlling a switch-mode power supply capable of operating in three different operational modes including a buck mode, a boost mode, and a buck-boost mode, comprising:
providing a controller that can initiate at least three different logic states, a first variable and a second variable;
selecting one of said operational modes by ascertaining logic values of said first variable at a first clock signal of fixed frequency and said second variable at a second clock signal of fixed frequency respectively; and
operatively switching to provide an output voltage that has a predetermined voltage relationship with input voltage based on said operation mode,
wherein said selecting an operation mode for said switch-mode power supply further comprises
generating a first mode indicator signal (BUCK) and generating a second mode indicator signal (BOOST); and
adding a voltage offset to said ramp signal when said boost mode has been selected, said voltage offset proportional to the phase difference between said first clock signal and said second clock signal.

* * * * *